(12) United States Patent
Vitali et al.

(10) Patent No.: US 8,432,963 B2
(45) Date of Patent: Apr. 30, 2013

(54) METHOD FOR ENCODING SIGNALS, RELATED SYSTEM AND PROGRAM PRODUCT

(75) Inventors: Andrea L. Vitali, Bergamo (IT); Stefano Olivieri, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1604 days.

(21) Appl. No.: 11/175,960

(22) Filed: Jul. 5, 2005

(65) Prior Publication Data

US 2006/0015792 A1    Jan. 19, 2006

(30) Foreign Application Priority Data

Jul. 6, 2004 (EP) .................................. 04015819

(51) Int. Cl.
| | |
|---|---|
| H04N 7/12 | (2006.01) |
| H04N 11/02 | (2006.01) |
| H04N 11/04 | (2006.01) |
| G06K 9/00 | (2006.01) |
| G06F 11/00 | (2006.01) |
| G06F 11/30 | (2006.01) |
| H03M 13/00 | (2006.01) |
| H04L 1/18 | (2006.01) |

(52) U.S. Cl.
USPC ...... 375/240.01; 382/251; 714/746; 714/751; 714/779

(58) Field of Classification Search ............... 375/240.1
See application file for complete search history.

(56) References Cited

U.S. PATENT DOCUMENTS

| 6,370,666 B1 * | 4/2002 | Lou et al. ..................... 714/751 |
|---|---|---|
| 6,460,153 B1 * | 10/2002 | Chou et al. ................... 714/746 |
| 7,222,285 B2 * | 5/2007 | Chou et al. ................... 714/779 |
| 2001/0016080 A1 * | 8/2001 | Goyal et al. .................. 382/251 |
| 2005/0207497 A1 | 9/2005 | Rovati et al. ............. 375/240.16 |
| 2005/0207498 A1 | 9/2005 | Vitali et al. .............. 375/240.16 |
| 2005/0213658 A1 | 9/2005 | Vitali et al. .............. 375/240.03 |

FOREIGN PATENT DOCUMENTS

| EP | 1 578 131 | 9/2005 |
|---|---|---|
| EP | 1 578 133 | 9/2005 |
| EP | 1 578 134 | 9/2005 |

OTHER PUBLICATIONS

Jiang et al., "Multiple Description Coding via Polyphase Transform and Selective Quantization", SPIE Conference on Visual Communications and Image Processing, vol. 3653, pp. 998-1008, 1999.*
Comas et al., "Unbalanced Multiple-Description Video Coding with Rate-Distortion OPtimization", EURASIP Journal on Applied Signal Processing 2003: vol. 1, pp. 81-90.*
Horn et al., "Robust Internet Video Transmission Based on Scalable Coding and Unequal Error Protection", Signal Processing: Image Communication 15, 1999, pp. 77-94.*

(Continued)

*Primary Examiner* — Christopher S Kelley
*Assistant Examiner* — Hee-Yong Kim
(74) *Attorney, Agent, or Firm* — Seed IP Law Group PLLC

(57) ABSTRACT

A system for encoding digital signals for transmission over a channel by allocating redundant channel encoding bits, includes at least one encoder configured for: subjecting the digital signals to multiple description coding to produce therefrom multiple description encoded signals, and allocating at least part of the redundant channel encoding bits to the multiple description encoded signals.

17 Claims, 5 Drawing Sheets

OTHER PUBLICATIONS

Choi, K-P., et al., "Bit Error Correctable Multiple Description Coding," *IEICE Trans. Fundamentals*, E87-A(6):1433-1440, Jun. 6, 2004.

Ekmekci, S., et al., "Unbalanced Quantized Multiple Description Video Transmission Using Path Diversity," *Proc. of SPIE-IS&T Electronic Imaging*, 5022:301-311, Jan. 21, 2003.

Goyal V., et al., "Optimal Multiple Description Transform Coding of Gaussian Vectors," in Proceedings of the Data Compression Conference, Los Alamitos, CA, Mar. 30-Apr. 1, 1998, pp. 388-397.

Goyal, V., "Multiple Description Coding: Compression Meets the Network," *IEEE Signal Processing Magazine*, 18(5):74-93, Sep. 2001.

Lee, Y-C. et al., "Layered Coded vs. Multiple Descriptions Coded Video Over Error-Prone Networks," *Signal Processing: Image Communication*, 18(5):337-356, May 2003.

Mohr, A., et al., "Generalized Multiple Description Coding through Unequal Loss Protection," in *Proceedings of the International Conference on Image Processing*, New York, Oct. 24, 1999, pp. 411-415.

Reibman, A., et al., "Performance of Multiple Description Coders on a Real Channel," in *Proceedings of the IEEE International Conference on Acoustics, Speech, and Signal Processing*, USA, pp. 2415-2418.

Wang, Y. et al., "Wireless Video Transport Using Path Diversity: Multiple Description vs. Layered Coding," in *Proceedings of the International Conference on Image Processing*, Rochester, New York, Sep. 22-25, 2002, pp. 21-24.

Apostolopoulos et al., "Modeling Path Diversity for Multiple Description Video Communication" IEEE International Conference on Acoustics, Speech and Signal Processing, Feb. 2002, 4 pages.

Apostolopoulos et al., "On Multiple Description Streaming with Content Delivery Networks" IEEE INFOCOM, Jun. 2002, 10 pages.

Apostolopoulos et al., "Unbalanced Multiple Description Video Communications Using Path Diversity" IEEE International Conference on Image Processing (ICIP), Thessaloniki, Greece, Oct. 2001, 4 pages.

Apostolopoulos et al., "Video Streaming: Concepts, Algorithms, and Systems" HP Laboratories, Palo Alto, California, Sep. 18, 2002, 35 pages.

Cosman et al., "Vector Quantization of Image Subbands: A Survey" IEEE Transactions of Image Processing, Sep. 14, 1995, 43 pages.

Goyal, "Beyond Traditional Transform Coding" Dissertation, University of California, Berkley, Fall 1998, 233 pages.

Goyal et al., "Multiple Description Transform Coding of Images" Proceedings of ICIP, 1998, 5 pages.

Gray et al., "Quantization" IEEE Transactions on Information Theory 44(6): 2325-2383, Oct. 1998.

Kovacevic et al., "Multiple Descriptions Source-Channel Coding Methods for Communications" Bell Labs, Innovations for Lucent Technologies, Murray Hill, New Jersey, 1998, 14 pages.

Puri et al., "Application of FEC based Multiple Description Coding to Internet Video Streaming and Multicast" Proceedings of the Packet Video 2000 Workshop, Forte Village Resort, Sardinia, Italy, May 2000, 10 pages.

Puri et al., "Forward error correction (FEC) codes based multiple description coding for internet video streaming and multicast" Signal Processing: *Image Communication* 16: 745-762, 2001.

Puri et al., "Multiple Description Source Coding using Forward Error Correction Codes" Proceedings of the 33red Asilomar Conference on Signals, Systems, and Computers, Pacific Grove, California, Oct. 1999, 342-346.

Servetto, "Compression and Reliable Transmission Of Digital Image and Video Signals" Thesis, University of Illinois at Urbana-Champaign, 1999, 108 pages.

Swann, "MPEG-II Video Coding for Noisy Channels" Dissertation, University of Cambridge, Trinity College, Mar. 11, 1998, 96 pages.

Wah et al., "A Survey of Error-Concealment Schemes for Real-Time Audio and Video Transmissions over the Internet" IEEE Proceedings of the International Symposium on Multimedia Software Engineering, Dec. 2002, 8 pages.

\* cited by examiner

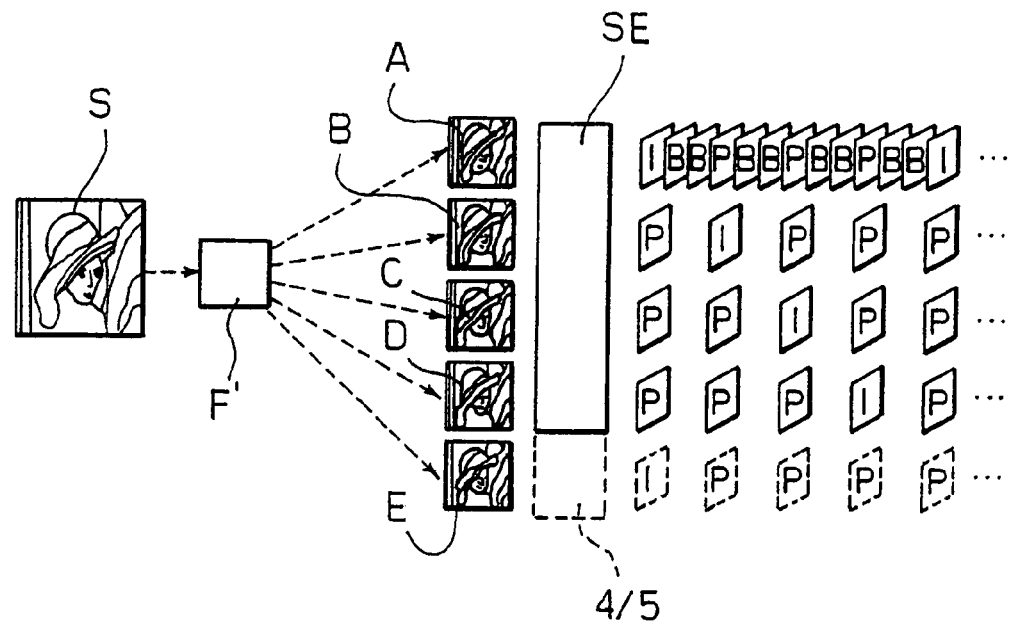
Fig_1
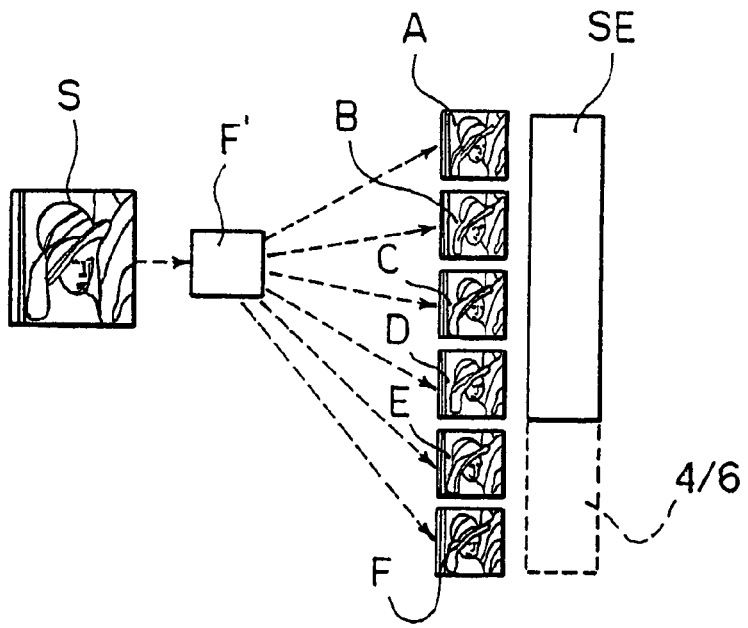
Fig_2

Fig_5
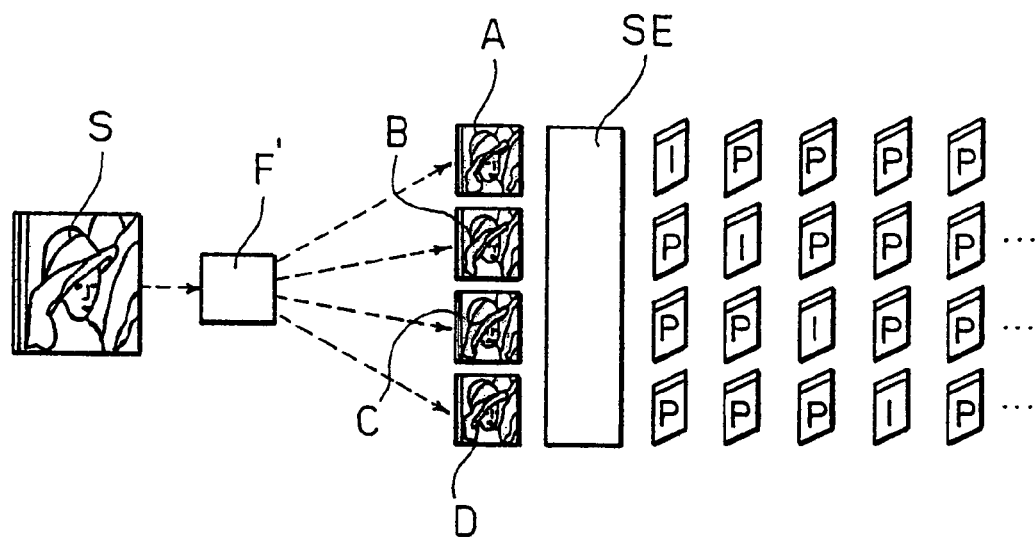
Fig_6
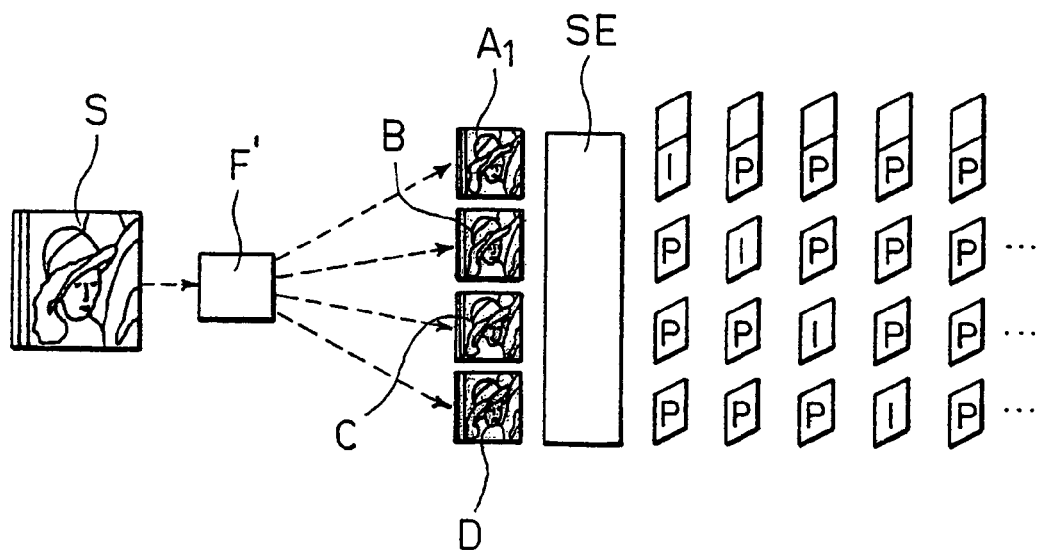

Fig_7
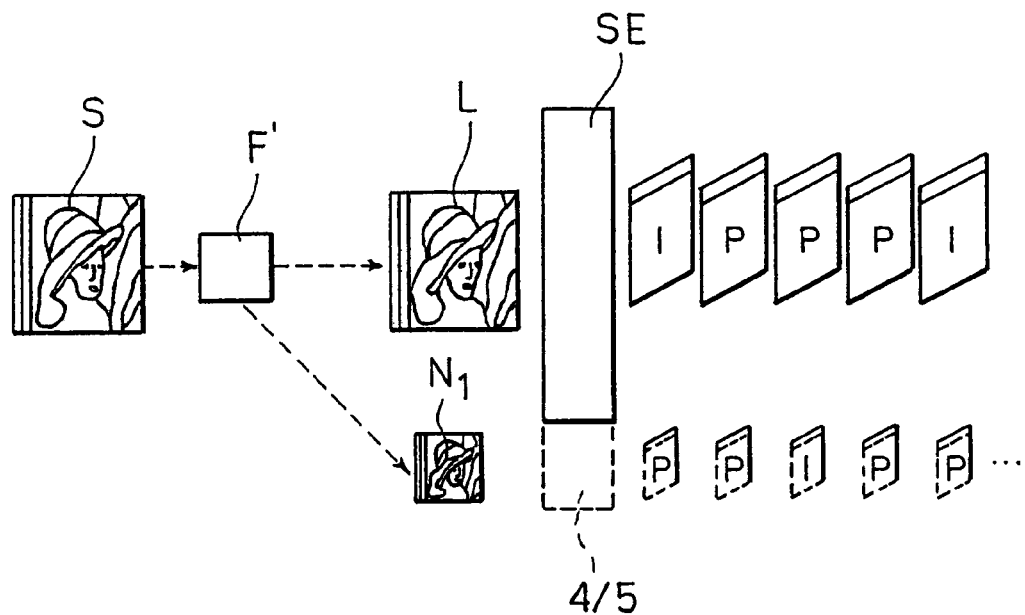
Fig_8
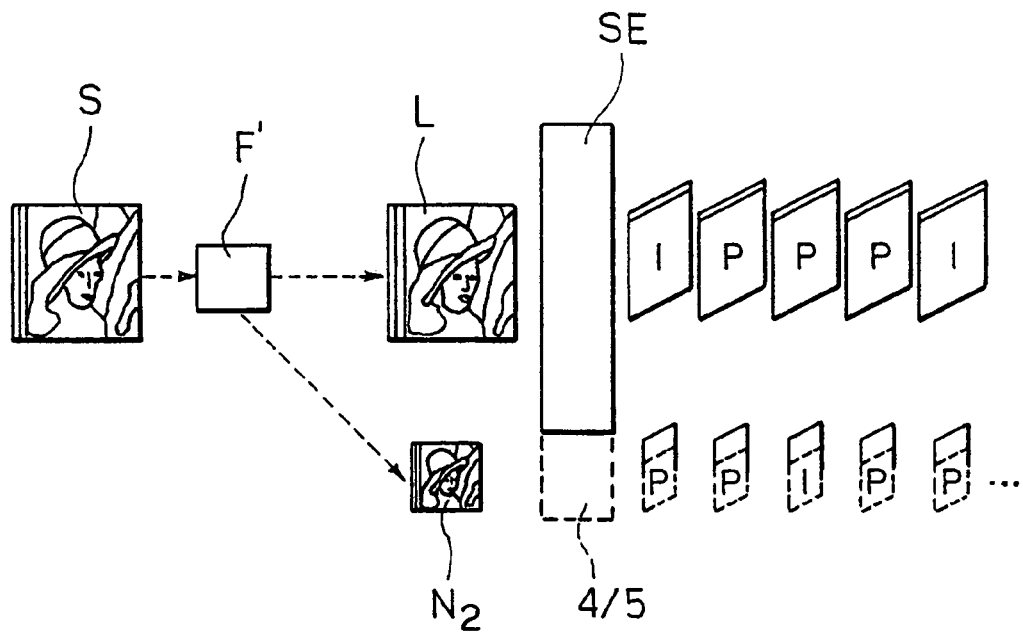

METHOD FOR ENCODING SIGNALS, RELATED SYSTEM AND PROGRAM PRODUCT

BACKGROUND OF THE INVENTION

1. Field of the Invention

The present invention relates to coding techniques, for instance for images and video signals.

However, reference to images and video signals must not be construed in a limiting sense of the scope of the invention. The invention applies in an undifferentiated manner to any kind of digital signals, irrespective of their nature (audio, video, data).

2. Description of the Related Art

The goal of Multiple Description Coding (MDC), as described, e.g., in V. K. Goyal "Multiple Description Coding: Compression Meets the Network" IEEE Signal Proc. Mag. September 2001 pp. 74-93, is to create several independent bit-streams using an existing video codec (i.e., coder-decoder). Bit-streams can be decoded independently or jointly. The larger the number of the bit-streams decoded, the larger the quality of the output video signal.

Multiple Description Coding employs a pre-processing stage upstream of the encoder, in order to split the video sequence and control redundancy among subsequences. It also employs a post-processing stage downstream of the decoder, in order to merge the received and successfully decoded sub-streams.

Multiple Description Coding greatly improves error resiliency, because each bit-stream can be decoded independently. Also, variable bandwidth/throughput requirements can be managed by transmitting a suitable number of descriptions. However, coding efficiency is somewhat reduced depending on the amount of redundancy left among subsequences.

Multiple Description Coding is essentially analogous to Scalable Coding (also known as Layered Coding). The difference lies in the dependency among bit-streams. The simplest case is when two bit-streams are created. In the case of scalable coding, they are referred to as "base layer" and "enhancement layer", respectively. The latter layer depends on the former layer and cannot be decoded independently therefrom. On the other hand, in the case of Multiple Description Coding, each description can be individually decoded to get a base quality video. As for Scalable Coding, there can be spatial, temporal or SNR (Signal-to-Noise Ratio) Multiple Descriptions (MD).

Replicated headers/syntax and replicated motion vectors among bit-streams greatly impede coding efficiency in SNR MD. Replicated headers/syntax also hinder temporal MD, and motion compensation is less effective because of the increased temporal distance between frames. Spatial MD is similarly hindered by headers/syntax. However, contrary to temporal MD, motion compensation is not affected, particularly when 8×8 blocks are split into smaller blocks, as in the latest H.264 codec (coder/decoder). Because of this, spatial MD Coding is usually regarded as the best choice for video coding.

The underlying video codec can be either one of the traditional solutions based on DCT (Discrete Cosine Transform) transform and motion compensation (e.g., MPEG-x, H.26x), or one of the more recent codec based on the wavelet 3D transform (e.g., SPHIT). The H.264 codec is particularly promising because of its increased coding efficiency, which helps in compensating for the losses due to replicated headers/syntax overhead.

Additionally, multimode prediction (up to four motion vectors per 8×8 block) is expected to assist with Spatial MD. Several schemes exists: overlapping quantization (MDSQ or MDVQ), correlated predictors, overlapped orthogonal transforms, correlating linear transforms (MDTC, e.g., PCT or pair-wise correlating transform for 2 MD), correlating filter banks, interleaved spatial-temporal sampling (e.g., video redundancy coding in H.263/H.263+), spatial-temporal polyphase down-sampling (PDMD), domain based partitioning (in the signal domain or in a transform domain), FEC based MDC (e.g., using Reed-Solomon codes).

A simple scheme for Signal-to-Noise Ratio MD is coding of independent video flows created by means of MD quantizers, either scalar or vector (MDSQ, MDVQ). The structure of the MD quantizer controls redundancy.

A simple scheme for Spatial/Temporal MD is coding of independent video flows created by means of Spatial or Temporal Polyphase Down-sampling (PDMD). A programmable Spatial or Temporal low-pass filter controls redundancy.

As an example, Temporal MD can be achieved by separating odd and even frames, creating two subsequences. Alternatively, odd and even fields can be separated. Spatial MD is achieved by separating pixels of 2×1 blocks, so that 2 subsequences are created. Alternatively 4 sub-sequences can be created by separating pixels in 2×2 block. The two techniques can be combined. Unlike temporal MD, spatial MD requires careful processing to avoid color artifacts caused by down-sampled chroma formats and field interlacing. Each subsequence is then fed into a standard video encoder.

A technique known as "Multiple Description Coding by means of FEC" (MD by FEC) is disclosed in R. Puri, K. W. Lee, K. Ramchandran and V. Bharghavan, "Forward Error Correction (FEC) Codes Based Multiple Description Coding for Internet Video Streaming and Multicast", Signal Processing: Image Communication, Vol. 16, No.~8, pp~745-762, May 2001, as well as R. Puri and K. Ramchandran, "Multiple Description Source Coding Through Forward Error Correction Codes", Proceedings of the 33rd Asilomar Conference on Signals, Systems, and Computers, Pacific Grove, Calif., October 1999, and R. Puri, K. W. Lee, K. Ramchandran and V. Bharghavan, "Application of FEC based Multiple Description Coding to Internet Video Streaming and Multicast", Proceedings of the Packet Video 2000 Workshop, Forte Village Resort, Sardinia, Italy, May 2000.

This scheme provides an effective way to build Multiple Descriptions (descriptions that are independently decodable) from "layered" bitstreams, that is layers that are dependent and prioritized: from base to enhancements by using Forward Error Correction codes such as Reed-Solomon. This technique can be referred to briefly as "LC2MD by FEC", i.e., Layered Coding to Multiple Description by Forward Error Correction.

The LC2MD by FEC scheme is not very flexible and suffers from a structural inefficiency.

In order to generate N descriptions, the LC2MD by FEC scheme needs an encoder able to generate N layers.

Alternatively, the encoder should be able to generate a "progressive" bit-stream (in the sense that it can be truncated to any point), which can then be split into N parts.

Unfortunately, not all state-of-the-art encoders are progressive or able to perform layered coding.

The n-th layer (from 1, the base, to N, the last enhancement) is split into n data packets, and n-N parity packets are added so that any n out of N total packets will help the decoder to reconstruct the n data packets and to decode the n-th layer.

Each packet is sent over a different description. In this way, if n descriptions are received, the layers from first up to n-th will be decoded. The higher the number of descriptions received, the higher the decoded quality as happens for MD coding.

Three layers (A=base, B=enhancement1, C=enhancement2) are needed to generate three descriptions. The first layer (A) can be simply copied into all the descriptions. The second layer (B) is split into two parts (B1, B2) that are sent in the descriptions 1 and 2; the last description will contain the result of the logic XOR operation of B1 and B2, B*=B1 xor B2. The third layer (C) is split into three parts (C1, C2 and C3), which are sent in descriptions 1, 2 and 3.

It is clear that, if only one description is received, only the first layer can be decoded. If two descriptions are received, also the second layer can be decoded. Finally, if all three descriptions are received, all layers can be decoded.

Such an arrangement exhibits a marked structural inefficiency.

Firstly, there is an overhead; the overhead is minimum if the layer n is smaller in size with respect to layers m<n, the overhead is maximum if layers have comparable sizes. Moreover, layered coding is inefficient with respect to standard single layer coding and therefore will add its own overhead.

Layers can be obtained by data partitioning. Data partitioning does not add overhead by itself. Unfortunately it generates layers that have comparable size.

For this reason the "LC2MD by FEC" scheme will introduce a huge overhead. Spatial scalability can be used. This adds overhead but layers will be larger and larger, hence the overhead introduced by LC2MD by FEC will be minimized (but always present).

Additionally not all received bits can be used. Therefore there is a waste of successfully received data.

If only one description is received, the layer A is decoded. But the half part of layer B (B1, B2 or B3) and the third part of layer C (C1, C2 or C3) are wasted. If two descriptions are received, the layer A and B are decoded, but the two parts over three of layer C successfully received are wasted.

The topics considered in the foregoing are covered by extensive technical literature, as witnessed, e.g., by:

P. C. Cosman, R. M. Gray, M. Vetterli, "Vector Quantization of Image Subbands: a Survey", September 1995;

Robert Swann, "MPEG-2 Video Coding over Noisy Channels", Signal Processing and Communication Lab, University of Cambridge, March 1998;

Robert M. Gray "Quantization", IEEE Transactions on Information Theory, vol. 44, n.6, October 1998;

Vivek K. Goyal, "Beyond Traditional Transform Coding", University of California, Berkeley, Fall 1998;

Jelena Kovacevic, Vivek K. Goyal, "Multiple Descriptions—Source-Channel Coding Methods for Communications", Bell Labs, Innovation for Lucent Technologies, 1998;

Jelena Kovacevic, Vivek K. Goyal, Ramon Arean, Martin Vetterli, "Multiple Description Transform Coding of Images", Proceedings of IEEE Conf. on Image Proc., Chicago, October 1998;

Sergio Daniel Servefto, "Compression and Reliable Transmission of Digital Image and Video Signals", University of Illinois at Urbana-Champaign, 1999;

Benjamin W. Wah, Xiao Su, Dong Lin, "A survey of error-concealment schemes for real-time audio and video transmission over internet". Proceedings of IEEE International Symposium on Multimedia Software Engineering, December 2000;

John Apostolopoulos, Susie Wee, "Unbalanced Multiple Description Video Communication using Path Diversity", IEEE International Conference on Image Processing (ICIP), Thessaloniki, Greece, October 2001;

John Apostolopoulos, Wai-Tian Tan, Suise Wee, Gregory W. Womell, "Modeling Path Diversity for Multiple Description Video Communication", ICASSP, May 2002;

John Apostolopoulos, Tina Wong, Wai-Tian Tan, Susie Wee, "On Multiple Description Streaming with Content Delivery Networks", HP Labs, Palo Alto, February 2002;

John Apostolopoulos, Wai-Tian Tan, Susie J. Wee, "Video Streaming: Concepts, Algorithms and Systems", HP Labs, Palo Alto, September 2002;

Rohit Puri, Kang-Won Lee, Kannan Ramchandran and Vaduvur Bharghavan. Forward Error Correction (FEC) Codes Based Multiple Description Coding for Internet Video Streaming and Multicast. Signal Processing: Image Communication, Vol. 16, No. 8, pp~745-762, May 2001;

Rohit Puri and Kannan Ramchandran. Multiple Description Source Coding Through Forward Error Correction Codes In the Proceedings of the 33rd Asilomar Conference on Signals, Systems, and Computers, Pacific Grove, Calif., October 1999;

Rohit Puri, Kang-Won Lee, Kannan Ramchandran and Vaduvur Bharghavan. Application of FEC based Multiple Description Coding to Internet Video Streaming and Multicast. Proceedings of the Packet Video 2000 Workshop, Forte Village Resort, Sardinia, Italy, May 2000.

BRIEF SUMMARY OF THE INVENTION

The basic object of the present invention is to overcome the intrinsic disadvantages of the prior art arrangements considered in the foregoing.

According to the present invention, that object is achieved by means of a method having the features set forth in the claims that follow. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

In brief, a preferred embodiment of the arrangement described herein provides for encoding digital signals for transmission over a channel by allocating redundant channel encoding bits by:

subjecting the digital signals to multiple description coding (MDC) to produce therefrom multiple description encoded signals, and allocating at least part of the redundant channel encoding bits to the multiple description encoded signals.

Obviously, the wording "transmission over a channel" is inclusive of possible recording of the digital data on a recording carrier (e.g., recording on a disk), which represents the channel involved.

Such a preferred embodiment of the invention thus relies on using multiple description coding "in substitution of" and/or "in combination with" channel codes, e.g., where forward error correction capability "is required", and/or "is available". The solution described herein proposes a way to use Multiple Description Coding in substitution of Forward Error Correction, which is especially useful when Forward Error Correction can be turned off and the bit-budget for Forward Error Correction can be used by source encoders.

The solution described herein also proposes the optimal way to use Multiple Description Coding in combination with Forward Error Correction, in particular when several Forward Error Correction codes are available and can be used for Unequal Error Protection (UEP) of descriptions. The solution described herein can be applied to the case of Polyphase Down-sampling MD of filtered data. In particular, the solution can be applied when the mathematical method for Multiple Description coding is used. The solution can also be applied to the case of joint MD encoding/decoding, this latter arrangement being described in detail i.a. in European patent applications Nos. 04006489.1, 04006490.9, and 04006491.7.

While the "LC2MD by FEC" scheme known in the art is not very flexible and suffers from a structural inefficiency, the solution described herein does not set any constraint on the characteristics of the underlying coder-decoder structure. In the solution described herein, Multiple Descriptions are generated natively by source encoders. Forward Error Correction is not used as a method to convert Layered Coding to Multiple Descriptions. Hence, there is no overhead except the one inherent to Multiple Description Coding with respect to Single Description Coding. However, the amount of this overhead can be precisely controlled. In the solution described herein all received bits will be used. Successfully received data will always contribute to decoded quality.

BRIEF DESCRIPTION OF THE DRAWINGS

The invention will now be described, by way of example only, with reference to the enclosed figures of drawing, wherein:

FIG. 1 shows a Multiple Description Video Coding used in substitution of channel coding with rate ⅘;

FIG. 2 shows a Multiple Description Video Coding used in substitution of channel coding with rate 4/6 (i.e., rate ⅔);

FIG. 5 shows a Multiple Description Video Coding in combination with Forward Error Correction evenly distributed among bit-streams;

FIG. 6 shows a Multiple Description Video Coding in combination with Forward Error Correction unevenly distributed among bit-streams. Available FEC is used to armor only one description;

FIG. 7 shows an Unbalanced Multiple Description Video Coding in combination with Forward Error Correction evenly distributed among bit-streams.

FIG. 8 shows an Unbalanced Multiple Description Video Coding in combination with Forward Error Correction unevenly distributed among bit-streams.

DETAILED DESCRIPTION OF THE INVENTION

Figure 3:
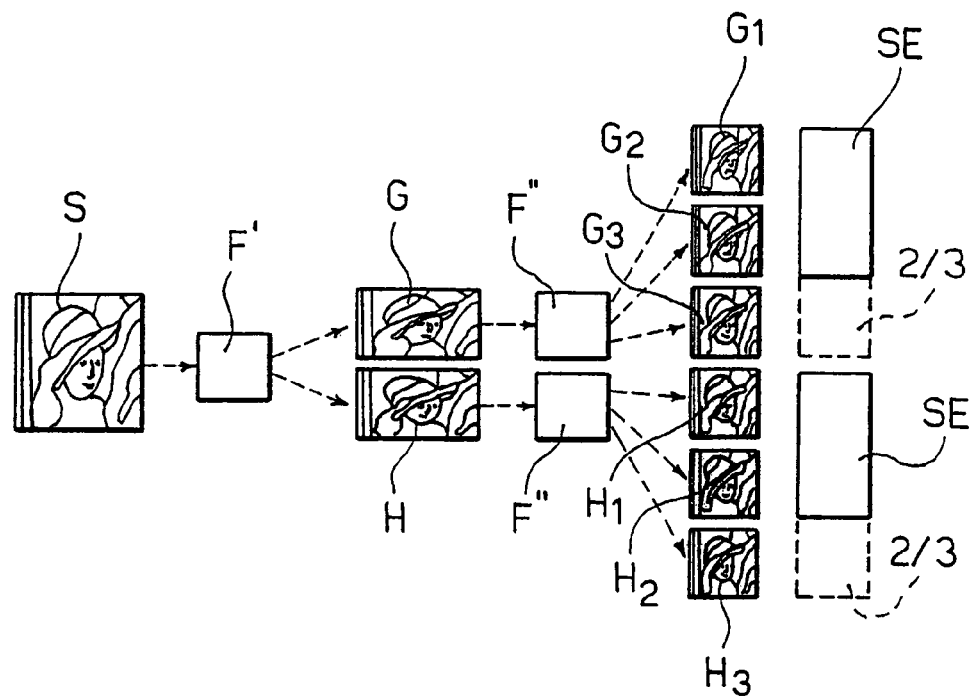
FIG. 3 shows a Cascaded structure for Multiple Description Video Coding used in substitution of channel coding with rate ⅔.

All the block diagrams of FIGS. 1 to 8 refer to a general framework suitable for any video communication system, which may result beneficial when compared to typical separated source coding/channel coding approach.

As is well known, channel coding expands the data provided by the source encoder by adding so-called "parity bits". These parity bits allow the channel decoder to identify and (if possible) correct errors. Usually, the higher the number of parity bits, the higher the correction capability of the code.

A synthetic parameter is the "code rate" which is the ratio between the source bits and the transmitted bits. As an example, if a code has rate ⅘, it means that 1 parity bit is generated every 4 source bits. Therefore 5 bits are transmitted every 4 source bits.

"Systematic" codes simply add parity bits to source bits. Then source bits are transmitted together with parity bits. On the opposite, "non-systematic" codes generate 5 bits that generally do not contain source bits but are linked to them. Only these coded bits are transmitted.

Usually the channel encoder works on blocks of data (block codes). Complex codes operate on the whole bit-stream (convolutional codes).

The easiest way to perform Multiple Description Coding (MDC) is to generate multiple descriptions of the data to be coded.

This may done by resorting to a wide variety of different methods. While some of these will be exemplified in the following, those of skill in the art will promptly appreciate that the applicability of the arrangement described herein is in no way limited to any specific MDC approach as described herein.

Each description obtained via MDC can be encoded by a suitable encoder. Alternatively, descriptions can be encoded jointly.

If the descriptions are similar to the original data, then the same compression algorithm can be used to encode them. As an example, Polyphase Down-sampling MD does generate descriptions with the same statistic of the original sequence, hence state-of-the-art encoders can be used to compress them, as shown in European patent application No. 04006490.9 already mentioned in the foregoing.

State-of-the art encoders can be modified cleverly to perform joint encoding in order to maximize the error resilience of multiple descriptions. Also, state-of-the-art decoders can be modified cleverly to do joint decoding in order to fully exploit MD redundancy and maximize the error concealment capability of multiple descriptions, as shown in the European patent application No. 04006491.7.

Alternatively, multiple descriptions can be generated in the compressed domain. Source data is encoded (and possibly compressed), and then descriptions are generated from the compressed bit-stream.

As a first example, the compressed bit-stream can be replicated.

As a second example, adapted for use in standard encoders based on prediction-transform-quantization-entropy coding, low frequency transform coefficients may be transmitted on all descriptions and a set of different high-frequency coefficients may be transmitted in each description.

As a third example, adapted for use in standard encoders, multiple descriptions can be generated based on prediction error rather than in the compressed domain.

Usually, the strictest constraint of a transmission channel is the available bandwidth. The available bandwidth is always divided in two parts: source bits, provided by the source encoder, and parity bits, provided by channel encoder.

The purpose of the source encoder is to remove the redundancy (and the perceptual irrelevancy for the case of lossy compression) in order to compress data and use efficiently the available bandwidth.

The purpose of the channel encoder is to add some controlled redundancy in order to detect and, if possible, correct some of the errors introduced by the channel.

Generally speaking, trying to compress the information as much as possible does not amount to an optimal choice, while an optimal tradeoff is achieved when allocating the bandwidth between source encoder devoted to compression and channel encoder for error protection should be found.

For the case of video encoding, the optimal tradeoff point is hard to find. In fact, the less compressed the source bits, the more they are resistant to errors. Hence they can be less protected. Some error resilience is provided by the source encoder, but it is different than the error resilience provided by the channel encoder.

In fact, channel encoders are good in correcting random errors. If errors come in bursts, inter-leavers must be used to break them. Conversely, source encoders are good in facing bursts of errors. Their performance in countering random errors is poor.

Experiments have shown however that it generally pays to increase the error resilience by means of less efficient source compression, rather than trying to dedicate more bits to FEC protection.

Multiple Descriptions provide a higher error resilience with respect to a Single Description, even if the aggregate bit-rate of all descriptions is the same as for a single description.

The increased error resilience must be taken into account. Given a bit-budget, it is possible to dedicate less space to parity bits, and more space to source bits. Then the top-quality of the decoded video (when all descriptions are used) will be higher than the case where much space is dedicated to parity bits.

Once again, those of skill in the art will promptly appreciate that the applicability of the arrangement described herein is in no way limited to any specific MDC approach exemplified herein.

As a first example, a spatial Polyphase Down-sampling Multiple Description, schematically represented by a block F' in FIG. 1, can be used—in a manner known per se—to generate four descriptions A, B, C, D of a given video sequence S. Each description contains a sub-sequence that has one fourth of the original size.

Additionally a fifth description E is generated, e.g., simply as a replica of one of the four descriptions generated by Polyphase Down-sampling Multiple Description on 2×2 blocks. Alternatively, the fifth description E can be generated taking the average M of the other four descriptions, A, B, C, D.

The consequences of either choice may be appreciably different. In the former case (description E being a copy of one of the four descriptions A, B, C, D), the original sequence S can be entirely decoded if one description is lost and if the lost description is the one that has been copied (or its copy). In the latter case (description E being the average M of the four descriptions A, B, C, D), the original sequence S can always be decoded if one description is lost, irrespective of what one description has been lost.

This may be easily understood because the Multiple Description scheme is equivalent to having five equations (the descriptions) with four unknown variables (the pixels of the original sequence). In the former case, when one of descriptions not copied is lost, the unknown variables cannot be computed because of the low rank of the matrix. In the latter case, the four unknown variables can always be computed because the rank is always four.

Adopting a correct MD guarantees a behavior similar to error correction codes. This can be easily done, e.g., by using the scheme described in European patent application No. 04006490.9 already mentioned in the foregoing.

It is thus possible to guarantee through MD coding the same behavior of error correction codes: the original sequence S can be decoded if any four out of five descriptions are successfully received and decoded. This is equivalent to a FEC with rate 4/5 and correction capability of one that is the codeword of five bits can be decoded to four source bits in presence of one detected error.

FIG. 1 shows a Multiple Description Video simultaneous encoding used in substitution of channel coding with rate 4/5 within the framework of an encoding process performed by an encoder SE.

This is preferably a "simultaneous" encoding process that involves allocating at least part of said the redundant channel encoding bits to the multiple description encoded signals A to E.

The right-hand portion of FIG. 1 shows how the various descriptions of the video sequence S may then subject to standard video processing (e.g., MPEG processing) to produce I, P, and B images/frames.

As another example, shown in FIG. 2, spatial Polyphase Down-sampling MD, again indicated by block F', can be used to generate four descriptions A, B, C, D each having one-fourth f the original size.

Additionally, two other descriptions E, F are generated, e.g., by copying two of the other four descriptions A, B, C, D.

It will be appreciated that this does not guarantee—per se—the same behavior as a FEC with rate 4/6 (or 2/3, which is the same).

However, a MD encoding scheme can be devised (e.g., as disclosed in European patent application No. 04006490.9) in order to guarantee that the four unknowns (pixels) are always computable when any four out of the six descriptions are successfully decoded. This is equivalent to a FEC with rate 2/3 and correction capability of two that is the codeword of six bits can be decoded to four source bits in presence of two detected errors.

Consequently, the arrangement of FIG. 2 represents a Multiple Description Video coding adapted to be used in substitution of channel coding with rate 4/6.

Preferably, this is once again (as is the case of all the other exemplary embodiments shown herein) a "simultaneous" encoding process that involves allocating at least part of said the redundant channel encoding bits to the multiple description encoded signals A to E.

The arrangement of FIG. 2 again provides for standard video processing (e.g., MPEG processing) to produce I, P, and B images/frames (not shown explicitly in FIG. 2).

In both the arrangements of FIGS. 1 and 2 joint MD encoding may be used to properly interleave intra I pictures (e.g., as explained in European patent application No. 04006491.7) in order to maximize error resiliency. Joint MD decoding also leads to fully exploiting MD redundancy and maximizing error concealment capabilities.

Various arrangements can be adopted to generate parity bits.

FIG. 3 shows a first example, where two descriptions G, H are generated in the block F' in the first step. Then, they can be protected by using a FEC with rate 2/3 or they can be protected by using again MD coding.

Specifically, each description G, H is sent over the transmission/recording channel in the form of three descriptions G1, G2, G3 and H1, H2, H3, respectively generated in two MD encoding blocks designated F'''.

The three descriptions are generated so that any two of them will be sufficient.

In comparison with the arrangement shown in FIG. 2, the arrangement of FIG. 3 has the disadvantage that it is not equivalent to a FEC with rate 4/6 and correction capability of two. Instead it is equivalent to two FEC with 2/3 and correction capability of one.

The codeword length is shorter, being three. The error resilience is lower: in fact, in the presence of random errors, the probability to have more than one error every three bits will be greater than the probability to have more than two errors every six bits.

Essentially, FIG. 3 shows a cascaded structure for Multiple Description Video Coding used in substitution of channel coding with 2/3. In general, having a longer codeword will improve performance because the number of errors within a single codeword will always approach the average bit error rate. The correction capability can be chosen to face this average error rate.

The examples described so far show how balanced MD coding can be used to provide channel coding. However, descriptions need not have the same importance. Unbalanced MD coding can be used as well.

In the arrangement shown FIG. 4 (where the same reference signs have been used to designate elements/blocks identical to those already described in connection with FIGS. 1 to 3), the parity bits are provided by a description N that is smaller with respect to "source" bits L that correspond to the full-size original sequence S. In the example shown, the second description N has one-fourth of the original size, this solution is equivalent to FEC with rate 4/5.

Figure 4:
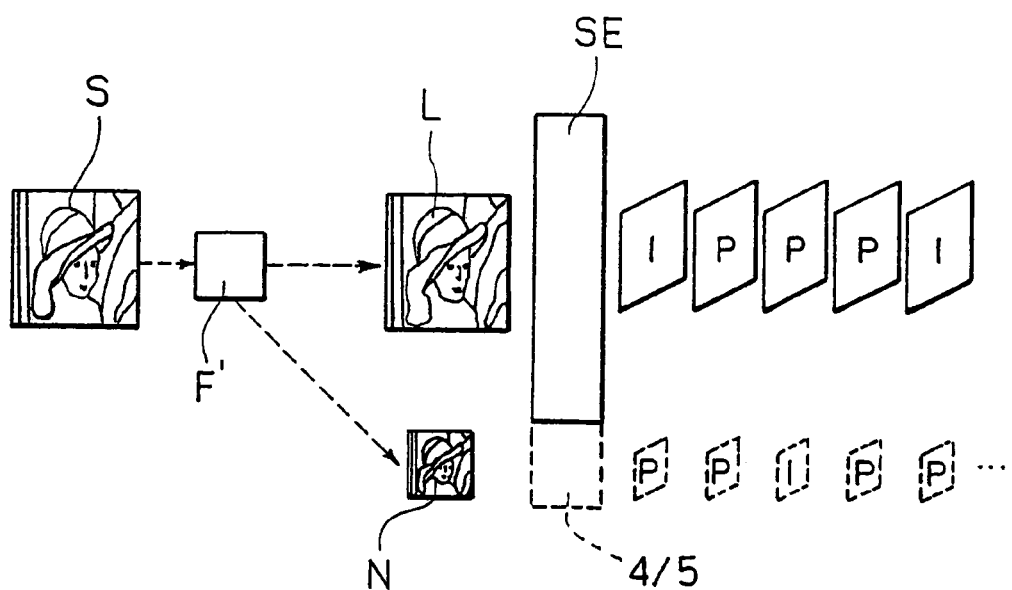
FIG. 4 shows an Unbalanced Multiple Description Video Coding used in substitution of channel coding with rate ⅘.

FIG. 4 thus shows an unbalanced Multiple Description Video Coding used in substitution of channel coding with rate 4/5. There, in order to maximize error resiliency, joint MD encoding may be used to properly interleave the intra I pictures (e.g., as explained in European patent application No. 04006491.7).

FEC codes can be characterized by a given error detection and correction capability. They have an all-or-nothing behavior. If there are too many errors, the received bits will not be decoded correctly. In certain cases, this can be detected (errors detected but not corrected), in some other case, errors go undetected. If there are errors, but not too many, received bits will be decoded correctly.

Having no errors at all is thus the same as having some (correctable errors). When the channel is "good" there is a waste of capacity as the parity bits are useless. Unfortunately this is often the case as networks and systems are always designed to guarantee a basic level of performance in a given worst-case condition (and the worst case can be very bad).

For digital terrestrial TV, the FEC codes are designed to provide an acceptable quality for "far" receivers. Hence TV broadcast is heavily protected. This is not optimal for "near" receivers, for which lower FEC protection would be sufficient, with possibility of devoting more bits to TV data in order to experience a higher quality.

Conversely, when MD is used to generate parity bits, no all-or-nothing behavior but rather a graceful degradation in performance is experienced: the higher the error rate, the poorer the decoded quality. This is due to the nature of multiple description coding: descriptions are independently decodable and the more the decoded descriptions, the higher the quality.

Also, unlike standard FEC, when there are no errors, the quality can be higher than having some correctable error. In short: there is no waste of channel capacity.

As an example one may once more refer to the spatial Polyphase Down-sampling MD scheme described in the foregoing: five descriptions A to E are generated each having one fourth of the original size.

The five descriptions can be generated in clever manner so that any four out of the five of them will enable the decoder to compute the unknown variables, while the fifth description, if received, can be used to reduce the quantization error of the unknowns.

For instance, when the fifth description is a replica of one of the four descriptions generated by Polyphase Down-sampling MD, it can be encoded in a slightly different manner, e.g., using an offset quantizer. In case all five descriptions are received, the decoder will then have two slightly different copies, which can be combined to reconstruct the unknown variables with a higher precision.

This essentially amounts to having a multiple description of one of the descriptions, because the fifth is a slightly different copy of one of the other four descriptions.

As explained before, the level of protection can be lowered in presence of MD video encoding, because of the increased error resilience.

However, the budget dedicated to parity bits must be divided into a number of parts equal to the number of descriptions. The simplest solution is to distribute evenly that budget among the descriptions.

In the arrangement of FIG. 5, all the four descriptions A, B, C, D (having the same importance from the viewpoint of the source encoder) have the same level of protection. But, as the budget has been split, this level is low. Therefore, if the channel becomes really bad, no description A, B, C, D will be able to survive the errors and the decoded quality will be pretty low. Specifically, FIG. 5 shows a Multiple Description Video Coding in combination with Forward Error Correction distributed evenly among the resulting bit-streams.

It can easily be understood that it is better to use different levels of protection for each description. In particular, "armoring" only one description, namely A1, as shown in FIG. 6, may be more effective than trying to protect all descriptions.

If this is done, there is one description, A1, which is heavily protected. If the channel becomes really bad, this description A1 is likely to survive errors. Then the decoder will be able to guarantee a basic quality, thanks to this description.

FIG. 6 thus shows a Multiple Description Video Coding in combination with Forward Error Correction unevenly distributed among the resulting bit-streams. The available FEC is used to armor only one description.

Unequal error protection is a natural choice when unbalanced MD coding is used. The arrangement of FIG. 7 (which can be notionally referred back to the arrangement of FIG. 4) uses, in addition to the main description L, one smaller description N1 that has one-fourth of the original sequence size.

FIG. 7 thus shows an unbalanced Multiple Description Video Coding in combination with Forward Error Correction evenly distributed among bit-streams.

When unequal error protection is used, one description will be protected more heavily. Of course, it is easier to protect heavily the smaller description. This is schematically shown in FIG. 8, where the smaller description is designated N2.

FIG. 8 shows an unbalanced Multiple Description Video Coding in combination with Forward Error Correction unevenly distributed among bit-streams. As before, this arrangement ensures the delivery of at least this description and the decoder can guarantee a basic decoded quality.

Figure 9:
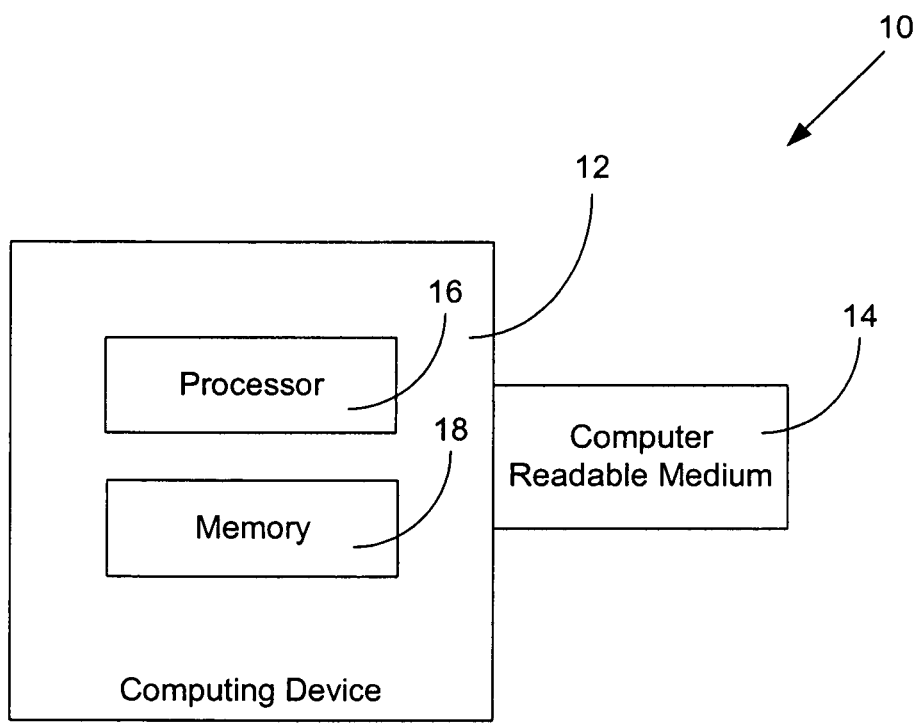
FIG. 9 is a block diagram of a computing system according to one embodiment of the present invention.

FIG. 9 is a block diagram of a computing system 10 that can be used to implement the methods described above. The computing system 10 includes a computing device 12 and a computer-readable medium 14. The computing device 12 includes a processor 16 and a memory 18 for implementing the methods described above. The computing device 12 could be implemented using a single general purpose computer, a distributed computing environment, a dedicated computing device for encoding data, or any other known computing device for implementing the methods described above. The computer-readable medium 14 stores instructions for causing the computing device to implement any of the methods described above.

The computer-readable medium 14 can be implemented by any medium that participates in providing instructions to the processor 16 for execution. Such a medium may take many forms, including but not limited to, non-volatile media, volatile media, and transmission media. Non-volatile media includes, for example, optical or magnetic disks. Volatile media includes dynamic memory, such as the main memory 18. Transmission media includes coaxial cables, copper wire and fiber optics, including wires that comprise a bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 16 for execution. For example, the instructions may initially be carried on a magnetic disk of a remote computer. The remote computer can load the instructions into its dynamic memory and send the instructions over a telephone line using a modem. A modem local to computing device 12 can receive the data on the telephone line and use an infrared transmitter to convert the data to an infrared signal. An infrared detector can receive the data carried in the infrared signal and place the data on an internal bus (not shown). The internal bus carries the data to the main memory 18, from which the processor 16 retrieves and executes the instructions.

While some possible embodiments of the invention have been exemplified in the foregoing, those of skill in the art will promptly appreciate that the applicability of the arrangement described herein is in no way limited to any specific MDC approach as described herein.

Specifically, while video signals have been referred to in discussing the examples disclosed, the same reasoning can be applied, e.g., to audio signals.

Generally speaking, the invention applies in an undifferentiated manner to multiple description coding (MDC) of any kind of digital signals, irrespective of their nature (audio, video, data).

This in order to permit, i.a.:
cross-layer optimization by tuning the FEC protection level and the error resilience provided by means of MD coding;
channel coding by means of balanced MD coding, where parity bits are simply generated by the MD encoder;
channel coding by means of cascaded, balanced MD coding;
channel coding by means of unbalanced MD coding;
channel coding by means of a combination of any of the foregoing;
unequal channel coding in combination with balanced MD coding;
unequal channel coding in combination with unbalanced MD coding; and
any possible combination of the foregoing.

The various embodiments described herein are thus exemplary of a method of encoding digital signals for transmission over a channel by allocating redundant channel encoding bits. The method is implemented by means of at least one encoder configured for:
subjecting the digital signals to multiple description coding to produce therefrom multiple description encoded signals, and
allocating at least part of the redundant channel encoding bits to the multiple description encoded signals.

The redundant channel encoding bits can be allocated in their entirety to the multiple description encoded signals. Alternatively, the possibility exists of selectively varying the portions of the redundant channel encoding bits allocated to channel encoding and to the multiple description encoded signals. Multiple description coding (MDC) can be performed both as balanced and as unbalanced multiple description coding.

At least part of the redundant channel encoding bits can be allocated as parity bits generated by the multiple description encoder. Multiple description coding (MDC) can be performed as cascaded multiple description coding.

Finally, the possibility exists of
allocating a first portion of the redundant channel encoding bits to the multiple description encoded signals, and
allocating a second portion of said redundant channel encoding bits to unequal channel encoding of the balanced/unbalanced multiple description encoded signals.

In case of unbalanced multiple description encoded signals comprising a set of descriptions including a smaller description, the first portion of the redundant channel encoding bits may be allocated to channel encoding ("armoring") the smaller/smallest description in the set.

Consequently, without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

The invention claimed is:

1. A method of encoding digital signals for transmission over a channel by allocating redundant channel encoding bits, the method comprising:
subjecting said digital signals to multiple description coding to produce therefrom multiple description encoded signals; and
allocating at least part of said redundant channel encoding bits to said multiple description encoded signals, wherein the allocating includes:
allocating a first portion of said redundant channel encoding bits to unbalanced multiple description encoded signals; and
allocating a second portion of said redundant channel encoding bits to unequal channel encoding of said multiple description encoded signals, wherein the unequal channel encoding includes protecting a first description of said multiple description encoded signals more heavily than a second description of said multiple description encoded signals, and wherein said unbalanced multiple description encoded signals comprise a set of descriptions including a larger description and a smaller description and wherein said first portion of said redundant channel encoding bits is allocated to channel encoding said smaller description in the set.

2. The method of claim 1, wherein the allocating step includes allocating all of said redundant channel encoding bits to said multiple description encoded signals.

3. The method of claim 1, wherein the allocating step includes selectively varying portions of said redundant channel encoding bits allocated to channel encoding and to said multiple description encoded signals.

4. The method of claim 1 wherein said multiple description coding includes performing unbalanced multiple description coding.

5. The method of claim 1 wherein the allocating step includes allocating at least part of said redundant channel encoding bits as parity bits generated by said multiple description coding.

6. The method of claim 1 wherein said multiple description coding includes performing cascaded multiple description coding.

7. A system for encoding digital signals for transmission over a channel by allocating redundant channel encoding bits, the system comprising at least one encoder configured to:
subject said digital signals to multiple description coding to produce therefrom multiple description encoded signals; and
allocate at least part of said redundant channel encoding bits to said multiple description encoded signals, said at least one encoder configured to allocate the at least part of said redundant channel encoding bits to said multiple description encoded signals by being configured to:
allocate a first portion of said redundant channel encoding bits to unbalanced multiple description encoded signals; and
allocate a second portion of said redundant channel encoding bits to unequal channel encoding of said multiple description encoded signals, wherein the unequal channel encoding includes protecting a first description of said multiple description encoded signals more heavily than a second description of said multiple description encoded signals, and wherein said unbalanced multiple description encoded signals comprise a set of descriptions including a larger description and a smaller description and wherein said first portion of said redundant channel encoding bits is allocated to channel encoding said smaller description in the set.

8. The system of claim 7, wherein said at least one encoder is configured to allocate all of said redundant channel encoding bits to said multiple description encoded signals.

9. The system of claim 7, wherein said at least one encoder is configured to selectively vary portions of said redundant channel encoding bits allocated to channel encoding and to said multiple description encoded signals.

10. The system of claim 7 wherein said at least one encoder is configured to perform said multiple description coding as unbalanced multiple description coding.

11. The system of claim 7 wherein said at least one encoder is configured to allocate at least part of said redundant channel encoding bits as parity bits generated by said multiple description coding.

12. The system of claim 7 wherein said at least one encoder includes a set of cascaded encoders configured to perform said multiple description coding as cascaded multiple description coding.

13. A non-transitory computer-readable medium whose contents cause a computing device to encode digital signals for transmission over a channel that is allocated redundant channel encoding bits, by performing a method comprising:
subjecting said digital signals to multiple description coding to produce therefrom multiple description encoded signals; and
allocating at least part of said redundant channel encoding bits to said multiple description encoded signals, wherein the allocating includes:
allocating a first portion of said redundant channel encoding bits to unbalanced multiple description encoded signals; and
allocating a second portion of said redundant channel encoding bits to unequal channel encoding of said multiple description encoded signals, wherein the unequal channel encoding includes protecting a first description of said multiple description encoded signals more heavily than a second description of said multiple description encoded signals.

14. The computer-readable medium of claim 13 wherein the computer-readable medium is a memory of a computing device.

15. The computer-readable medium of claim 13 wherein the computer-readable medium is remote from the computing device.

16. The computer-readable medium of claim 13, wherein the allocating step includes allocating all of said redundant channel encoding bits to said multiple description encoded signals.

17. The computer-readable medium of claim 13, wherein the allocating step includes selectively varying portions of said redundant channel encoding bits allocated to channel encoding and to said multiple description encoded signals.

* * * * *